UNITED STATES PATENT OFFICE.

SAMUEL FELIX, OF DRESDEN, GERMANY.

MAKING MALTED FOOD.

968,841. Specification of Letters Patent. Patented Aug. 30, 1910.

No Drawing. Application filed February 10, 1906. Serial No. 300,515.

*To all whom it may concern:*

Be it known that I, SAMUEL FELIX, subject of the Austro-Hungarian Emperor, and residing at Dresden, Germany, have invented certain new and useful Improvements in Processes of Manufacturing Malt Preparations, of which the following is a specification.

The present invention relates to a new and improved process for manufacturing alimentary preparations containing malt as chief ingredient.

The malt preparations now before the public consist simply of a mixture of a malt solution with milk, meat extract, lentil, pease, bean, rye, or wheat meal, or a decoction thereof, for the purpose of rendering the preparations easily digestible for the sickly, the convalescent, and for children, or of a mixture of malt with products of fermentation, such as for instance whey-beer.

The properties ascribed to these preparations are, however, only imperfectly obtained, and the ingredients are not in any way improved, since we have to deal solely with mixtures, in which the component parts may or may not retain their physical properties, for instance in regard to solubility, or we find the preparations to be peptonized, *i. e.* predigested to a certain degree.

The present invention has for its object the manufacture of a solid or pulverous malt preparation which contains besides the nutrimental power of the malt extract, certain constituents of such other natural aliments as suit the taste or are suitable to the state of health of the patient, and the invention is based upon the principle of permitting the ferments of malt to act, at the most efficient temperatures, upon the other ingredients, milk, meat, leguminosal and the like.

The process is carried out by way of example as follows: A suitable quantity, say one hundred (100) parts, of malt of barley, wheat, oats, etc., which is rich in nitrogen, and has the highest possible diastase and peptase properties is cured in a kiln at a temperature of about 90° Fahrenheit, and in a strong air current. Out of this kiln-dried malt is then obtained an infusion wort by retaining it in a suitable liquid, say one hundred parts of water, for a considerable time, say for 24 hours, more or less, at a low temperature say of from 95–105° F., especial care being taken not to exceed 160°. At a temperature of from 150–170° a portion of this liquid is mixed with and allowed to act on the meat, milk or other ingredients to be combined with the malt to form the preparation, and after such action for a suitable time, the residue of the malt infusion is added at suitable low temperatures, say from 95 to 120° F. The mash is kept for about thirty minutes at a temperature of about 110 degrees F., and for about sixty minutes at a temperature of about 140 to 160 degrees F. If milk is to be combined, one hundred parts diluted with an equal quantity of water are used. If meat is to be combined, twenty-five (25) parts, in an appropriately comminuted state, are used to each one hundred (100) parts of malt. I may use fifty (50) parts of leguminose to every one hundred (100) parts of malt. The resultant liquid product, after filtering, is now evaporated in a vacuum, and finally worked into solid or pulverous form.

The proportions herein named may be varied slightly to suit existing circumstances without departing from the scope of the invention.

What I claim as new is:

The herein described process of manufacturing malt preparations consisting in curing a quantity of malt by drying it at a temperature of about ninety degrees F., and in a strong air current, making an infusion wort thereof by mashing it for about twenty-four hours at a temperature of from 95 to 105° F., raising the resultant liquor to a temperature of from about 150 to 170° F., and to a portion thereof adding food ingredients substantially such as described, adding the remainder of the wort at a low temperature, keeping the mash for about ninety minutes at a temperature increasing from about 110 to about 160° F., filtering the resultant substance, and evaporating it *in vacuo*, and finally working it into dry form, all substantially as described.

In testimony whereof I affix my signature in presence of two witnesses.

SAMUEL FELIX.

Witnesses:
 EUGEN HÜLSMANN,
 PAUL ARRAS.